United States Patent
Yao et al.

(10) Patent No.: US 9,733,409 B2
(45) Date of Patent: Aug. 15, 2017

(54) LIGHT GUIDE PLATE, BACKLIGHT SOURCE AND DISPLAY APPARATUS

(71) Applicants: Boe Technology Group Co., Ltd., Beijing (CN); Boe Optical Science and Technology Co., Ltd., Suzhou (CN)

(72) Inventors: Yongli Yao, Beijing (CN); Wentao Ying, Beijing (CN); Xiaoli Xie, Beijing (CN)

(73) Assignees: BOE TECHNOLOGY GROUP CO., LTD., Beijing (CN); BOE OPTICAL SCIENCE AND TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 14/894,060

(22) PCT Filed: Apr. 14, 2015

(86) PCT No.: PCT/CN2015/076570
§ 371 (c)(1),
(2) Date: Nov. 25, 2015

(87) PCT Pub. No.: WO2016/107012
PCT Pub. Date: Jul. 7, 2016

(65) Prior Publication Data
US 2016/0356937 A1 Dec. 8, 2016

(30) Foreign Application Priority Data

Jan. 4, 2015 (CN) .................... 2015 2 0000638 U

(51) Int. Cl.
*F21V 8/00* (2006.01)
(52) U.S. Cl.
CPC ............ *G02B 6/002* (2013.01); *G02B 6/0031* (2013.01); *G02B 6/0068* (2013.01); *G02B 6/0088* (2013.01)

(58) Field of Classification Search
CPC .... G02B 6/0068; G02B 6/002; G02B 6/0023; G02B 6/0081
See application file for complete search history.

(56) References Cited

U.S. PATENT DOCUMENTS

| | | | |
|---|---|---|---|
| 7,401,965 B2 * | 7/2008 | Xu .................. | G02B 6/002 362/612 |
| 2006/0291250 A1 * | 12/2006 | Yang ................ | G02B 6/0031 362/615 |
| 2007/0147079 A1 * | 6/2007 | Wu .................. | G02B 6/002 362/612 |

FOREIGN PATENT DOCUMENTS

| CN | 2604706 | 2/2004 |
|---|---|---|
| CN | 101078795 | 11/2007 |

(Continued)

OTHER PUBLICATIONS

International Search Report and Written Opinion from PCT/CN2015/076570 dated Oct. 9, 2015.

*Primary Examiner* — Robert May
(74) *Attorney, Agent, or Firm* — Calfee, Halter & Griswold LLP

(57) ABSTRACT

The present invention relates to the technical field of display, and discloses a light guide plate, a backlight source and a display apparatus, for solving the problem of the exit light non-uniformity of the backlight source. The light guide plate comprises a light guide plate main body and at least one boss, the light guide plate main body comprises a first light entrance surface, a first light exit surface intersecting with the first light entrance surface, and a first bottom surface opposed to the first light exit surface; the boss is located on the first light entrance surface and comprises a second bottom surface adjoining the first light entrance surface, a top surface opposed to the second bottom surface, as well as two end faces and two side surfaces respectively intersecting (Continued)

with the top surface and the second bottom surface at two ends, wherein the area of the top surface is less than that of the second bottom surface, the two end faces are respectively flush with the first bottom surface and the first light exit surface, and the two side surfaces are respectively slope surfaces which may be used as a second light entrance surface. The light guide plate mentioned by the present invention is used to improve the exit light uniformity of the backlight source.

16 Claims, 3 Drawing Sheets

(56) References Cited

FOREIGN PATENT DOCUMENTS

| CN | 201035177 | 3/2008 |
|----|-----------|--------|
| CN | 202209593 | 5/2012 |
| CN | 103913797 | 7/2014 |
| CN | 104237996 | 12/2014 |

* cited by examiner

LIGHT GUIDE PLATE, BACKLIGHT SOURCE AND DISPLAY APPARATUS

REFERENCE TO RELATED APPLICATIONS

This application is the U.S. national stage entry of PCT/CN2015/076570, filed Apr. 14, 2015, which claims the priority to Chinese Patent Application No. 20152000638.5, filed Jan. 4, 2015, which is incorporated herein by reference in its entirety as a part of this application.

TECHNICAL FIELD

The present invention relates to the technical field of display, and particularly relates to a light guide plate, a backlight source and a display apparatus.

BACKGROUND ART

A liquid crystal display apparatus is widely applied to a display device due to advantages of low power consumption, long lifetime, environmental protection and the like. However, because a liquid crystal panel in the liquid crystal display apparatus does not have light emitting characteristic itself, it is needed to provide a surface light source apparatus to the liquid crystal panel, such as a backlight source, in order to enable the liquid crystal panel to display an image. The backlight source serves to provide a surface light source with uniform brightness to the liquid crystal panel, thereby enabling the liquid crystal panel to achieve the objective for displaying an image.

In an existing backlight source, a light emitting component generally employs a light emitting diode (hereinafter referred to as a LED) light source, wherein advantages of low working voltage, high light emitting brightness, high response speed, long lifetime and the like of the LED light source are mainly utilized. However, because the exit light of the LED light source has a relatively strong optical directivity, that is, the exit light has a certain divergence angle, when the exit light of the LED light source directly enters the light guide plate from a light entrance surface of the light guide plate, an optical dark region will appear on a light exit surface of the light guide plate. Particularly, with reference to FIG. 1 and FIG. 2, after light emitted out from each first light source 20 is incident on a light entrance surface 11 of a light guide plate main body 10, an optical dark region (a zone shown by a section line in drawings) will appear on one side, which is close to the light entrance surface 11, of a light exit surface 12. The optical dark region is mainly distributed between two adjacent first light sources 20, thereby causing a non-uniform light emitted out from the light exit surface 12, which seriously affects the exit light uniformity of the backlight source.

SUMMARY OF THE INVENTION

An objective of the present invention is to provide a light guide plate, a backlight source and a display apparatus, for improving the exit light uniformity of the backlight source.

To achieve the above objective, the present invention provides a light guide plate, comprising:

a light guide plate main body, the light guide plate main body comprises a first light entrance surface, a first light exit surface intersecting with the first light entrance surface, and a first bottom surface opposed to the first light exit surface; and at least one boss on the first light entrance surface, the boss comprises a second bottom surface adjoining the first light entrance surface, a top surface opposed to the second bottom surface, as well as two end faces and two side surfaces respectively intersecting with the top surface and the second bottom surface at two ends, wherein the area of the top surface is less than that of the second bottom surface, the two end faces are respectively flush with the first bottom surface and the first light exit surface, and the two side surfaces are respectively slope surfaces which may be used as a second light entrance surface.

In specific implementations, the two slope surfaces of the boss are at the same included angle with the first light entrance surface.

In specific implementations, the slope surfaces are flat surfaces or cambered surfaces.

In specific implementations, the boss and the light guide plate main body are an integral structure.

The present invention further provides a backlight source, comprising:

the light guide plate as described according to the above technical solution, the light guide plate comprises a light guide plate main body and at least one boss on the first light entrance surface of the light guide plate main body;

a reflector plate beside the light guide plate and opposed to the first light entrance surface of the light guide plate main body; and a first light source and a second light source between the first light entrance surface and the reflector plate, the first light source and the second light source are respectively located at two ends of the first light entrance surface, and respectively face towards the two slope surfaces of the boss.

In specific implementations, the first light source and the second light source are disposed in parallel and directly facing each other.

In specific implementations, the first light source and the second light source are obliquely arranged and are at the same included angle respectively with the first light entrance surface.

In specific implementations, the backlight source further comprises a third light source, and the third light source is opposed to a top surface of the boss.

Further, the above backlight source further comprises a backboard located outside the light guide plate, and a rubber frame connected with the backboard, and the reflector plate is located on a side wall of the backboard or a side wall of the rubber frame.

The present invention further provides a display apparatus, comprising a display panel, as well as the backlight source on a back surface of the display panel as described according to the above technical solution.

The light guide plate provided by the present invention comprises a light guide plate main body and at least one boss on a first light entrance surface of the light guide plate main body, two end faces of each boss are respectively flush with a first bottom surface and a first light exit surface of the light guide plate main body, and two side surfaces of each boss are respectively slope surfaces which may be used as a second light entrance surface. When guiding light with the light guide plate in the backlight source, two ends of the first light entrance surface of the light guide plate main body are respectively provided with a light source. Because one part of light emitted out from the two light sources will be incident on the slope surfaces of the boss, and enters the light guide plate main body after refraction by the slope surfaces, an optical dark region formed on the first light exit surface of the light guide plate main body may be eliminated, such that light is uniformly emitted out from the light guide plate, thereby improving the exit light uniformity of the backlight source and improving display quality of the display apparatus.

BRIEF DESCRIPTION OF THE DRAWINGS

The accompanying drawings illustrated herein are used to provide a further understanding of the present invention and constitute a part of the present invention. Schematic embodiments and illustration thereof of the present invention only serve to explain the present invention, without any limitation to the present invention. In the accompanying drawings.

REFERENCE NUMERALS

10—light guide plate main body, 11—first light entrance surface
12—first light exit surface, 13—first bottom surface
20—first light source, 21—second light source
22—third light source, 30—boss
31—slope surface, 32—top surface
40—reflector plate.

DETAILED DESCRIPTION OF THE INVENTION

To further describe a light guide plate, a backlight source and a display apparatus claimed by the present invention, a detail description will be made hereafter in connection to the accompanying drawings of the specification.

Figure 1:
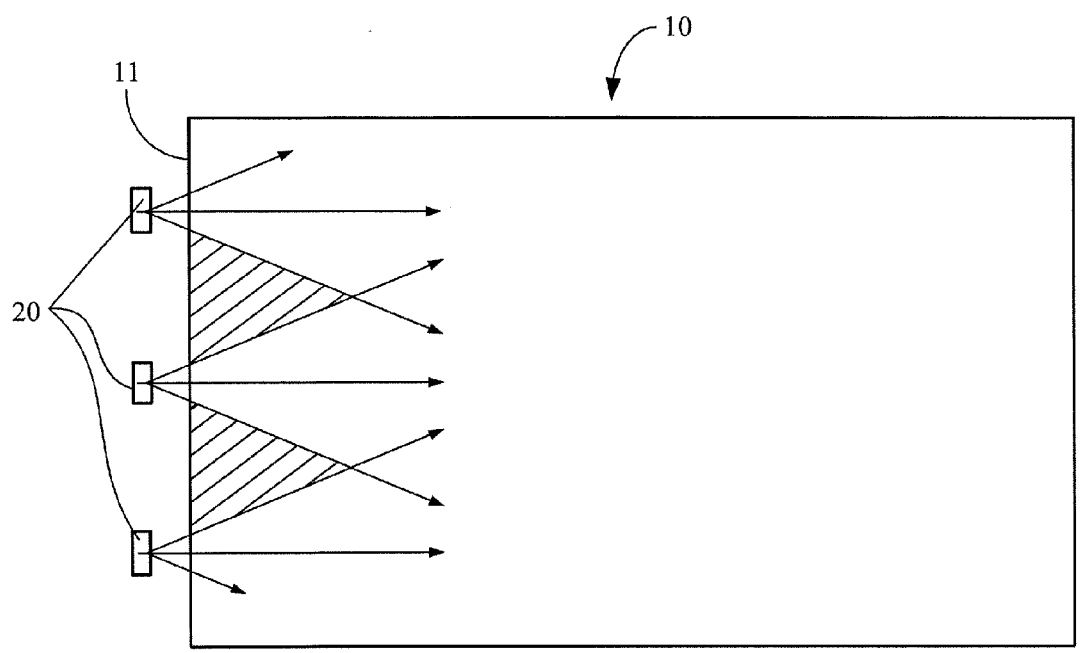
FIG. 1 is a plane view of a backlight source in the prior art.
Figure 2:
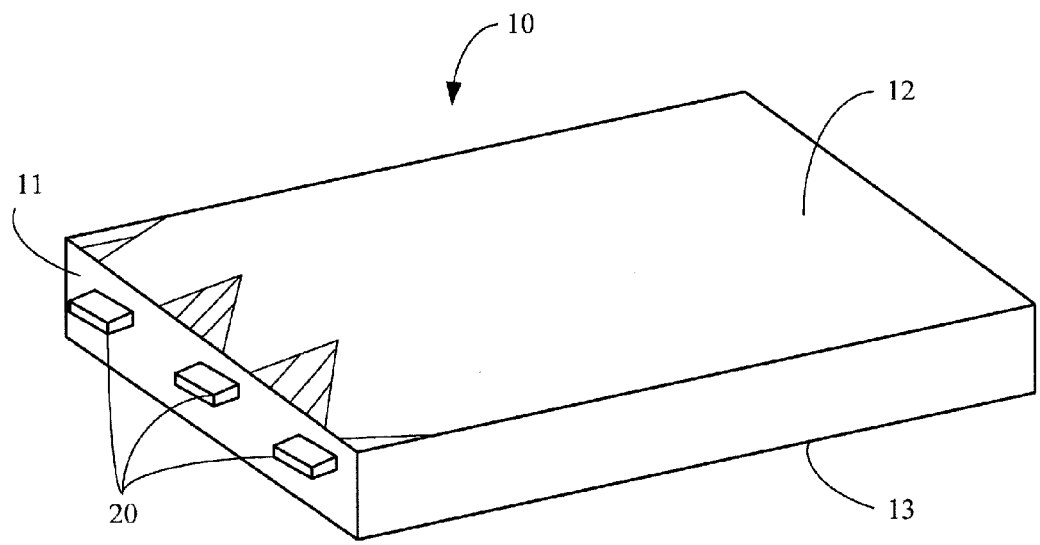
FIG. 2 is a perspective view of a backlight source shown in FIG. 1.
Figure 3:
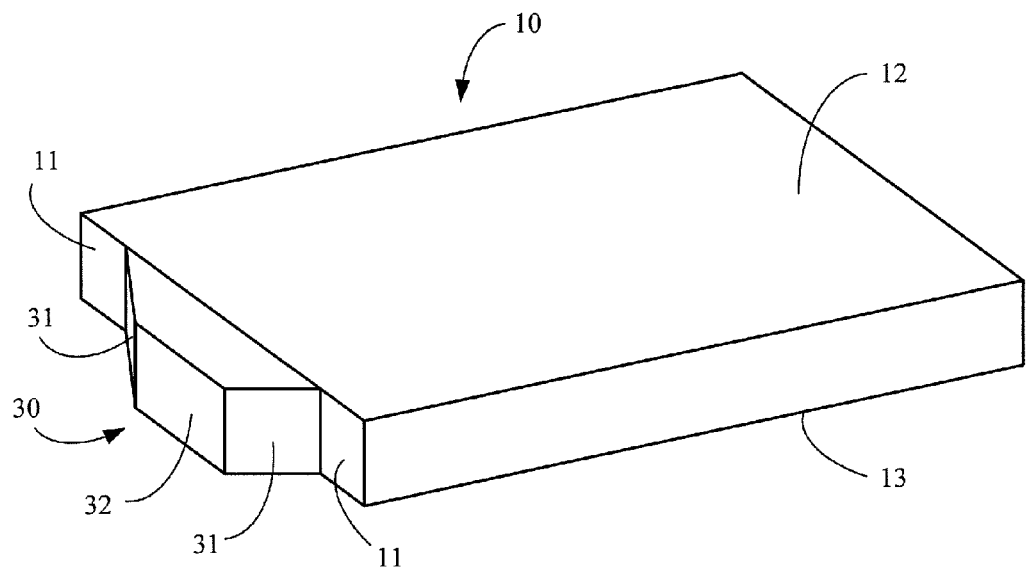
FIG. 3 is a perspective view of a light guide plate in an embodiment of the present invention.

With reference to FIG. 3, the light guide plate provided by an embodiment of the present invention comprises a light guide plate main body 10 and at least one boss 30, wherein the light guide plate main body 10 comprises a first light entrance surface 11, a first light exit surface 12 intersecting with the first light entrance surface 11, and a first bottom surface 13 opposed to the first light exit surface 12; and the boss 30 comprises a second bottom surface (not shown in the drawing) adjoining the first light entrance surface 11, a top surface 32 opposed to the second bottom surface, as well as two end faces (not shown in the drawing) and two side surfaces respectively intersecting with the top surface 32 and the second bottom surface at two ends, wherein the area of the top surface 32 is less than that of the second bottom surface, the two end faces are respectively flush with the first bottom surface 13 and the first light exit surface 12, and the two side surfaces are respectively slope surfaces 31 which may be used as the second light entrance surface.

Particularly, the first light entrance surface 11, the first light exit surface 12 and the first bottom surface 13 are respectively three side surfaces of the light guide plate main body 10. In FIG. 3, the first light entrance surface is a left side surface of the light guide plate main body 10, the first light exit surface 12 is an upper surface of the light guide plate main body 10, and the first bottom surface 13 is a lower surface of the light guide plate main body 10. The boss 30 is located on the first light entrance surface 11, the upper end face and the lower end face of the boss 30 are respectively flush with the first light exit surface 12 and the first bottom surface 13 of the light guide plate main body 10, the left and right (front and rear) two side surfaces of the boss 30 are respectively slope surfaces 31 at a certain angle with the first light entrance surface 11, and the slope surfaces 31 may serve as the second light entrance surface of the light guide plate. In specific implementations, the two slope surfaces 31 of the boss 30 are at the same included angle with the first light entrance surface 11, so as to improve the uniformity of light emitted out from the first light exit surface 12 of the light guide plate main body 10 and reduce the process difficulty for producing the light guide plate. It to be noted that, the above slope surfaces 31 may be particularly flat surfaces or cambered surfaces, and the top surface 32 of the boss 30 may be parallel to the light entrance surface 11, so as to facilitate subsequent assembly of the backlight source.

When the light guide plate in the backlight source employs the above structure, a reflector plate and at least two light sources are located beside the first light entrance surface 11 of the light guide plate main body 10, each light source is located between the reflector plate and the first light entrance surface 11, and two of the light sources are located at two ends of the first light entrance surface 11. After reflection by the reflector plate and refraction by the boss 30, the divergence angle of light from each light source is increased, thus an optical dark region formed on the first light exit surface 12 of the light guide plate main body may be eliminated, such that light is uniformly emitted out from the light guide plate, and further the exit light uniformity of the backlight source is improved.

Figure 4:
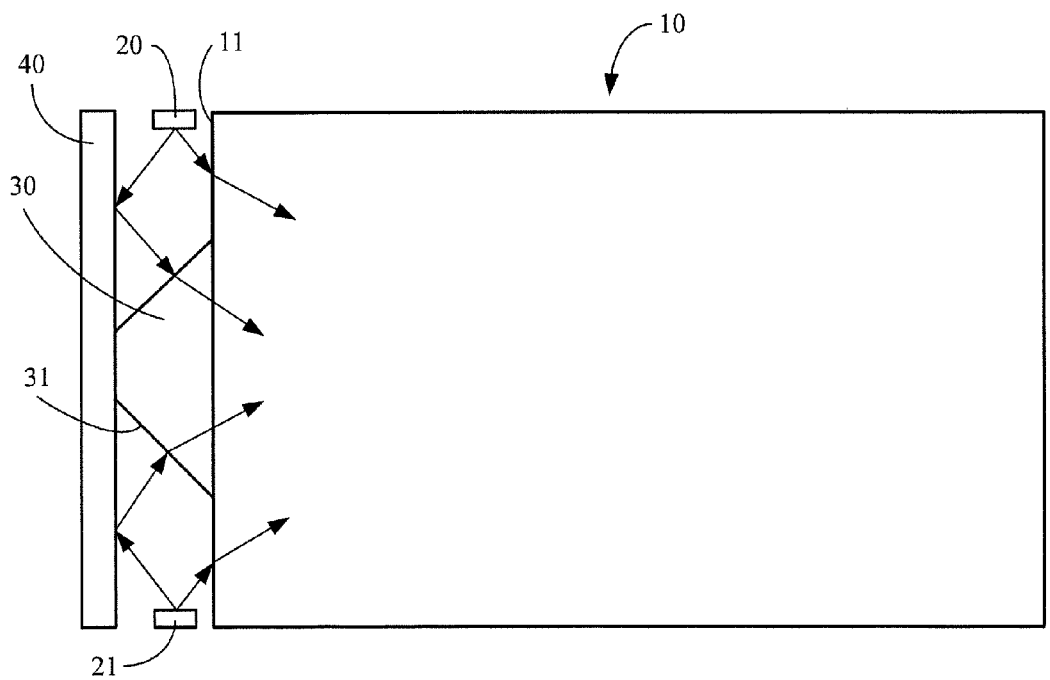
FIG. 4 is a plane view I of a backlight source in an embodiment of the present invention.
Figure 5:
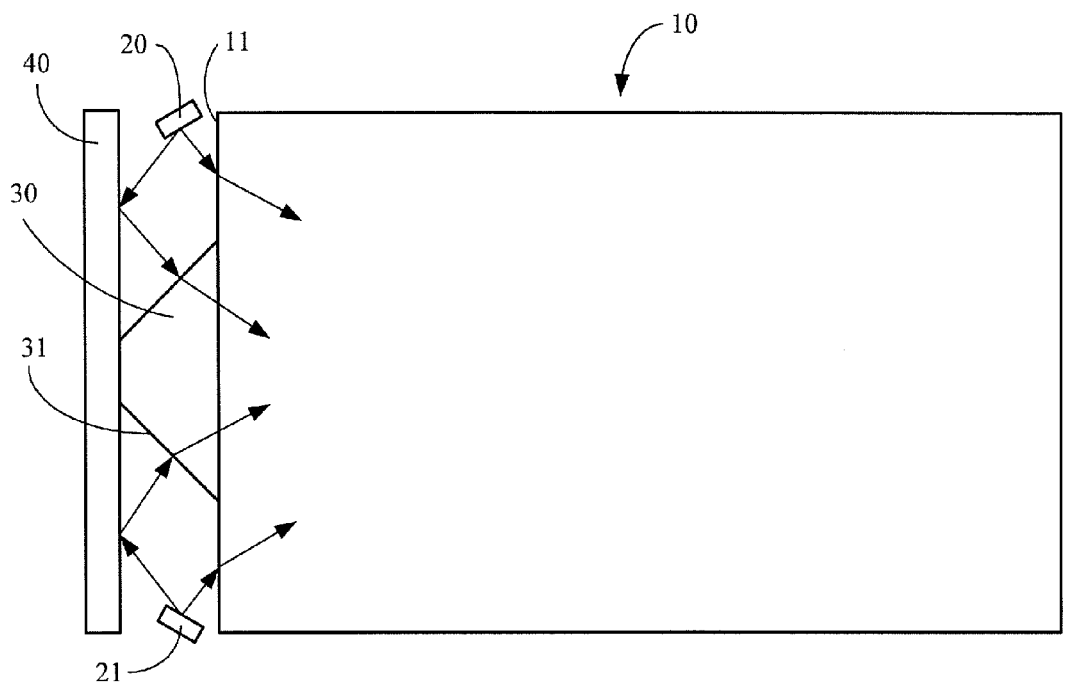
FIG. 5 is a plane view II of a backlight source in an embodiment of the present invention.

With reference to FIG. 4 and FIG. 5, an embodiment of the present invention further provides a backlight source, comprising the light guide plate mentioned by the above technical solution, wherein the light guide plate comprises a light guide plate main body 10 and at least one boss 30 on a first light entrance surface 11 of the light guide plate main body 10; a reflector plate 40 beside the light guide plate and opposed to the first light entrance surface 11 of the light guide plate main body 10; as well as a first light source 20 and a second light source 21 which are located between the first light entrance surface 11 and the reflector plate 40, and the first light source 20 and the second light source 21 are respectively located at two ends of the first light entrance surface 11, and respectively face towards two slope surfaces 31 of the boss 30.

In the above backlight source, by utilizing the light guide plate with a specific structure and two light sources used in conjunction with the light guide plate, an optical dark region formed on a first light exit surface 12 of the light guide plate main body 10 may be eliminated, and further the exit light uniformity of the backlight source is improved. A structure of the light guide plate has been described above, which will be omitted herein. The above two light sources may particularly be LED light sources, and main arrangements for the two light sources are as follows:

the first arrangement: with continued reference to FIG. 4, the first light source 20 and the second light source 21 are disposed in parallel and directly facing each other. Particularly, the first light source 20 and the second light source 21 are respectively located at two ends of the first light entrance surface 11, light exit surfaces of the first light source 20 and the second light source 21 respectively face towards two slope surfaces 31 of the boss 30, and the two light sources 20 are disposed in parallel and directly facing each other. One part of light emitted out from the first light source 20 and the second light source 21 enters the light guide plate main body 10 after refraction by the first light entrance surface 11, another part of light enters the light guide plate main body 10 after refraction by the slope surfaces 31, and the remaining light enters the light guide plate main body 10 after reflection by the reflector plate 40 and then refraction by the slope surfaces 31. As one part of light emitted out from the first light source 20 and the second light source 21 which are located at two ends of the first light entrance surface 11 may be incident on the slope surfaces 31, and enters the light guide plate main body 10 after refraction by the slope surfaces 31, an optical dark region formed on the first light exit surface 12 of the light guide plate main body 10 may be eliminated, such that the light is uniformly emitted out from the light guide plate, and further the exit light uniformity of the backlight source is improved.

the second arrangement, with continued reference to FIG. 5, the first light source 20 and the second light source 21 are both obliquely arranged and are at the same included angle respectively with the first light entrance surface 11. A technical effect achieved by the arrangement of the first light source 20 and the second light source 21 shown in FIG. 5 is substantially identical to that achieved by the arrangement of the first light source 20 and the second light source 21 shown in FIG. 4, which will be omitted herein. In addition, because exit light of the first light source 20 and the second light source 21 has a certain divergence angle, the light may be gathered between the reflector plate 40 and the first light entrance surface 11 by changing included angles of the first light source 20 and the second light source 21 relative to the first light entrance surface 11, thus the light emitted out from the first light source 20 and the second light source 21 may be fully utilized, and the utilization rate of the light is increased.

Figure 6:
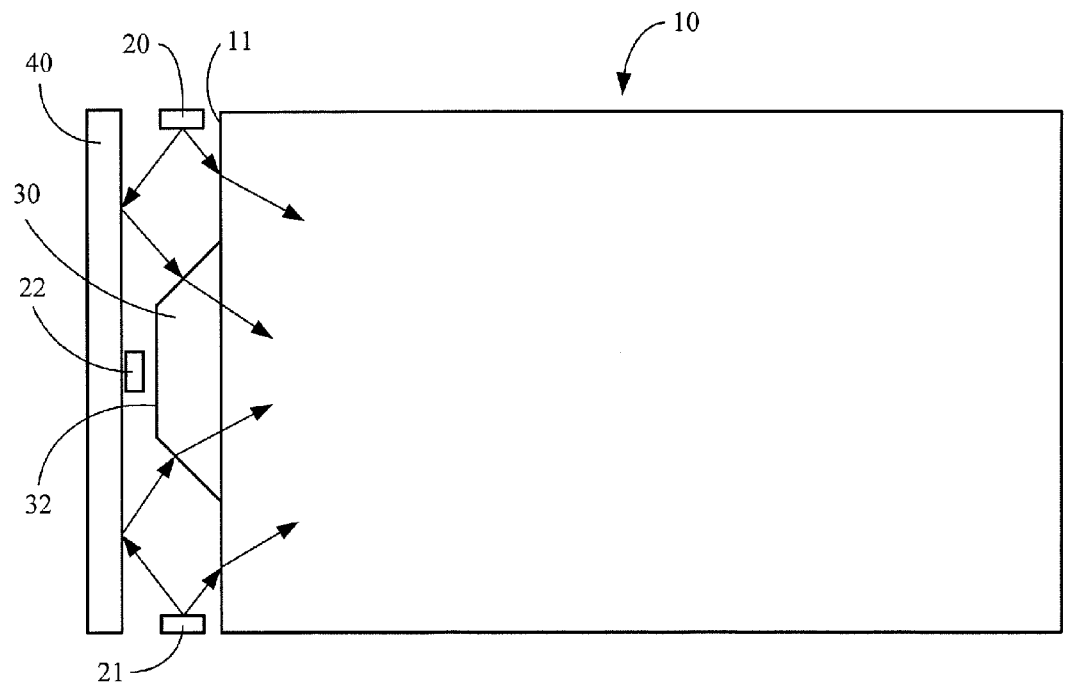
FIG. 6 is a plane view III of a backlight source in an embodiment of the present invention.

It is to be noted that, the light source arrangements described above are suitable for a case where a width of the light guide plate main body 10 is relatively small. If the width of the light guide plate main body 10 is relatively large, it is needed to arrange the light sources as follows, in order to avoid low brightness in the middle of the light guide plate main body 10.

the third arrangement, with reference to FIG. 6, in addition to the first light source 20 and the second light source 21 which are located at two ends of the first light entrance surface 11, the above backlight source further comprises a third light source 22, and the third light source 22 is opposed to a top surface 32 of the boss 30. Particularly, the top surface 32 of one boss 30 may correspond to one third light source 22, or the top surface 32 of one boss 30 may correspond to a plurality of third light sources 22, depending on the specific requirement. When the top surface 32 of the boss 30 is opposed to at least one third light source 22, the top surface 32 of the boss 30 may be used as a third light entrance surface of the light guide plate.

On the basis of the above embodiment, the above backlight source further comprises a backboard (not drawn in drawing), and a rubber frame (not drawn in the drawing) connected with the backboard, and the reflector plate 40 is located on a side wall of the backboard or a side wall of the rubber frame.

An embodiment of the present invention further provides a display apparatus, comprising a display panel, and a backlight source on a back surface of the display panel as mentioned by the above technical solution. By adopting the backlight source mentioned by the above technical solution, the exit light uniformity of the backlight source can be improved, thus the display quality of the display apparatus is improved. It is to be noted that the display apparatus may particularly be any product or part with a display function, such as a liquid crystal display apparatus, electronic paper, a mobile phone, a tablet computer, a television, a notebook computer, a digital photo frame, a navigator and the like.

In the description of the above implementation, specific features, structures, materials or characteristics may be combined in any suitable manner in any of one or more embodiments or examples.

The above content is merely detailed description of the present invention. However, the protection scope of the present invention is not limited to this. Within the technical scope disclosed by the present invention, many modifications or substitutions will readily occur to those skilled in the art, and all such changes or substitutions should fall within the protection scope of the present invention. Thus, the protection scope of the present invention should be interpreted solely in light of the claims.

The invention claimed is:

1. A backlight source, comprising:
   a light guide plate, comprising:
      a light guide plate main body, wherein said light guide plate main body comprises a first light entrance surface, a first light exit surface intersecting with said first light entrance surface, and a first bottom surface opposing to said first light exit surface; and
      at least one boss on said first light entrance surface, said boss comprises a second bottom surface adjoining said first light entrance surface, a top surface opposed to said second bottom surface, as well as two end faces and two side surfaces respectively intersecting with said top surface and said second bottom surface at two ends,
      wherein the area of said top surface is less than that of said second bottom surface, said two end faces are respectively flush with said first bottom surface and said first light exit surface, and said two side surfaces are respectively slope surfaces which can be used as a second light entrance surface,
   a reflector plate beside said light guide plate and opposed to the first light entrance surface of said light guide plate main body; and
   a first light source and a second light source between said first light entrance surface and said reflector plate, said first light source and said second light source are respectively located at two ends of said first light entrance surface, and respectively face towards said two slope surfaces of said boss.

2. The backlight source according to claim 1, wherein said two slope surfaces of said boss are at the same included angle with said first light entrance surface.

3. A display apparatus, comprising:
   a display panel; and
   the backlight source on a back surface of said display panel according to claim 2.

4. The backlight source according to claim 1, wherein said slope surfaces are flat surfaces or cambered surfaces.

5. A display apparatus, comprising:
   a display panel; and
   the backlight source on a back surface of said display panel according to claim 4.

6. The backlight source according to claim 1, wherein said boss and said light guide plate main body are an integral structure.

7. A display apparatus, comprising:
a display panel; and
the backlight source on a back surface of said display panel according to claim 6.

8. The backlight source according to claim 1, wherein said first light source and said second light source are disposed in parallel and directly facing each other.

9. A display apparatus, comprising:
a display panel; and
the backlight source on a back surface of said display panel according to claim 8.

10. The backlight source according to claim 1, wherein said first light source and said second light source are obliquely arranged and are at the same included angle respectively with said first light entrance surface.

11. A display apparatus, comprising:
a display panel; and
the backlight source on a back surface of said display panel according to claim 10.

12. The backlight source according to claim 1, wherein said backlight source further comprises a third light source, and said third light source is opposed to the top surface of said boss.

13. A display apparatus, comprising:
a display panel; and
the backlight source on a back surface of said display panel according to claim 12.

14. The backlight source according to claim 1, further comprising a backboard located outside said light guide plate, and a rubber frame connected with said backboard, and said reflector plate is located on a side wall of said backboard or a side wall of said rubber frame.

15. A display apparatus, comprising:
a display panel; and
the backlight source on a back surface of said display panel according to claim 14.

16. A display apparatus, comprising:
a display panel; and
the backlight source on a back surface of said display panel according to claim 1.

* * * * *